United States Patent
Kang et al.

(10) Patent No.: US 6,347,169 B1
(45) Date of Patent: Feb. 12, 2002

(54) APPARATUS AND METHOD FOR MONITORING OPTICAL SIGNAL

(75) Inventors: Yong-Hoon Kang, Kyungsangbuk-do; Byung-Jik Kim, Seoul, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,541

(22) Filed: Jan. 14, 2000

(30) Foreign Application Priority Data

Jan. 14, 1999 (KR) ................................................ 99-844

(51) Int. Cl.[7] ........................... G02B 6/28; H04B 10/12
(52) U.S. Cl. ......................................... 385/24; 359/127
(58) Field of Search ............................. 385/15, 24, 27, 385/37; 372/20, 23, 29.011, 29.021, 32, 38.01; 359/124, 127, 130

(56) References Cited

U.S. PATENT DOCUMENTS

| | | | |
|---|---|---|---|
| 5,617,234 A | 4/1997 | Koga et al. | 359/131 |
| 5,850,292 A | 12/1998 | Braun | 356/419 |
| 5,894,362 A | 4/1999 | Onaka et al. | 359/124 |
| 5,915,052 A | 6/1999 | Ball | 385/24 |
| 6,233,261 B1 * | 5/2001 | Mesh et al. | 372/32 |

\* cited by examiner

*Primary Examiner*—John D. Lee
(74) *Attorney, Agent, or Firm*—Robert E. Bushnell, Esq.

(57) ABSTRACT

An apparatus and method of monitoring multiple channel signals of a wavelength division multiplexing (WDM) signal in a WDM system. The optical signal monitoring apparatus includes: an optical demultiplexer having 2N+2 output ports, for receiving and demultiplexing by wavelength a wavelength division multiplexing (WDM) signal with N wavelengths, and outputting two output port signals for each channel via the 2N output ports and outputting two adjacent signals via the +2 output ports needed to measure the optical signal noise ratio outside the frequency range of the WDM signal; a signal conversion unit for receiving the output port signals from the optical demultiplexer and converting the received optical output port signals into digital signals; and a signal processing unit for receiving the digital signals and calculating the wavelength and optical power for each channel using the loss characteristics of the two output port signals of each channel. Therefore, the information about the multiple channel signals, such as the optical power, the wavelength and the optical signal to noise ratio (OSNR), can be simultaneously and accurately obtained by using the optical signal monitoring apparatus constructed as a small module.

16 Claims, 2 Drawing Sheets

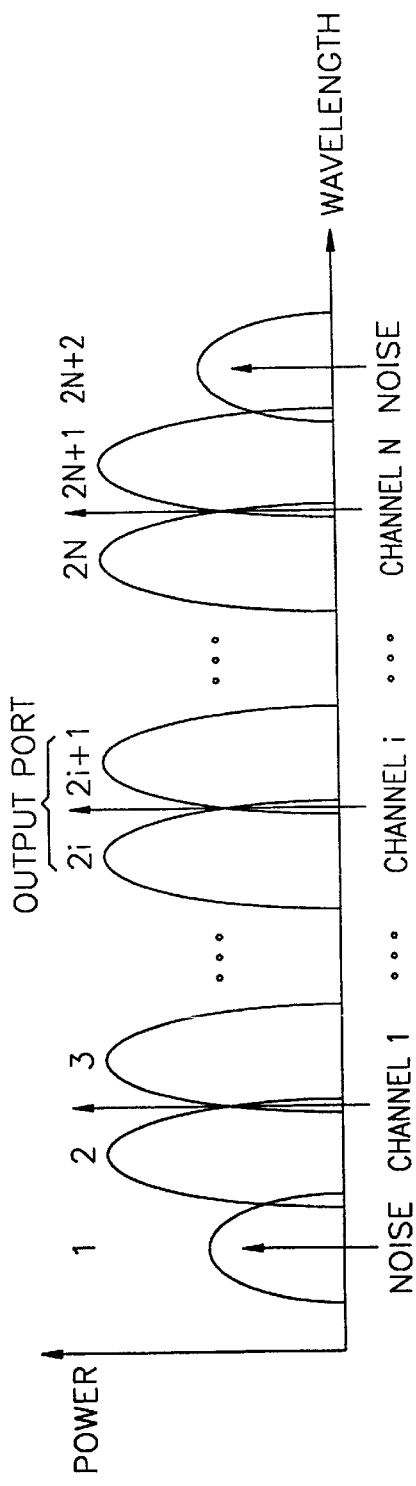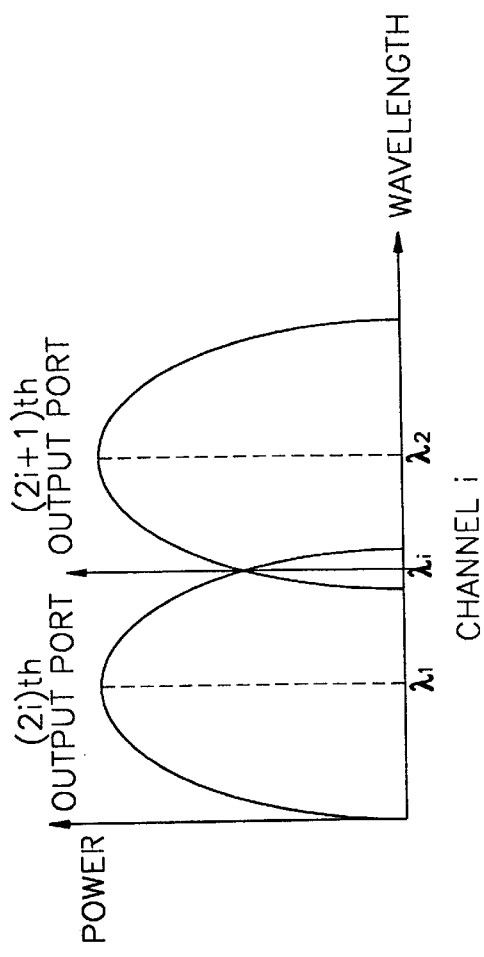

APPARATUS AND METHOD FOR MONITORING OPTICAL SIGNAL

CLAIM OF PRIORITY

This application makes reference to, incorporates the same herein, and claims all benefits accruing under 35 U.S.C §119 from an application entitled Apparatus And Method For Monitoring Optical Signal earlier filed in the Korean Industrial Property Office on Jan. 14, 1999, and there duly assigned Ser. No. 99-844 by that Office.

BACKGROUND OF THE INVENTION

1. Field of the Invention

The present invention relates to an apparatus and method for monitoring wavelength division multiplexed optical signals including multiple channel optical signals in a wavelength division multiplexing (WDM) system.

2. Description of the Related Art

In WDM systems, in which multiple optical channels are multiplexed and carried over a single optical fiber, channel quality monitoring is usually carried out after demultiplexing of each channel. However, recently, there is an increasing need for monitoring optical signal quality in a WDM state prior to the monitoring of the channel quality.

For monitoring multiple channel optical signals, the measurement on the optical power, the optical wavelength and the optical signal to noise ratio (OSNR) for each optical channel signal is required. In a WDM optical transmission system, the transmissions of the signals of neighboring channels as well as of the signal of the current channel are susceptible to error, and thus exact control of wavelength deviation for each channel is required. Also, there is a need to monitor the control of wavelength in real time.

In the use of a WDM optical amplifier, the optical power and the OSNR may vary for each channel. Thus, the channel-based monitoring thereon is required. Usually, the overall signal quality can be inferred from the OSNR and the optical power of each channel, and thus the factors of the OSNR and the optical power are necessarily measured to monitor the signal quality.

U.S. Pat. No. 5,617,234 to Masafumi Koga et al. entitled Multiwavelength Simultaneous Monitoring Circuit Employing Arrayed-Waveguide Grating, and incorporated by reference herein, teaches a multiwavelength simultaneous monitoring circuit employing an arrayed waveguide grating (AWG) and a photo diode array, which is capable of monitoring the wavelength for each channel. However, the disclosure requires that the AWG temperature be controlled in real time, additionally needs an optical signal for a reference wavelength, and fails to achieve the correct measurement of the optical power and the OSNR. In the channel monitoring of the WDM optical transmission system, the optical power, the wavelength, and the OSNR must be simultaneously monitored. However, the disclosure permits the measurement of only two of the three factors. That is, if two arbitrary factors are measured, it is not possible to measure the remaining one factor.

Of interest to the present invention, and incorporated by reference herein, are U.S. Pat. No. 5,894,362 to Hiroshi Onaka et al. entitled Optical Communication System Which Determines The Spectrum Of A Wavelength Division Multiplexed Signal And Performs Various Processes In Accordance With The Determined Spectrum; U.S. Pat. No. 5,850,292 to David M. Braun entitled Wavelength Monitor For Optical Signals; and U.S. Pat. No. 5,915,052 to Gary A. Ball entitled Loop Status Monitor For Determining The Amplitude Of The Signal components Of A Multiwavelength Optical Beam.

SUMMARY OF THE INVENTION

It is an object of the present invention to provide in a wavelength division multiplexing (WDM) system an apparatus and method for monitoring the quality of optical channel signals by measuring the optical power and the wavelength thereof.

It is another object of the present invention to provide in a wavelength division multiplexing (WDM) system an apparatus and method for monitoring the quality of optical channel signals by simultaneously measuring the optical power, the wavelength and the optical signal to noise ratio (OSNR) thereof.

According to an aspect of the present invention, there is provided an optical signal monitoring apparatus comprising: an optical demultiplexer, having 2N output ports, for receiving and demultiplexing, by wavelength, a wavelength division multiplexing (WDM) signal with N wavelengths, and outputting two output port signals for each channel via the 2N output ports; a signal conversion unit for receiving the output port signals from the optical demultiplexer and converting the received optical output port signals into digital signals; and a signal processing unit for receiving the digital signals and calculating the wavelength and optical power for each channel using the loss characteristics of the two output port signals of each channel.

According to another aspect of the present invention, there is provided a method of monitoring an optical signal, comprising the steps of: (a) demultiplexing by wavelength a wavelength division multiplexing (WDM) signal with N wavelengths into two optical signals for each channel, to output a total of 2N optical signals; (b) converting the optical signals from the step (a) into digital signals; and (c) receiving the digital signals to calculate the wavelength and the optical power for each channel, using the loss characteristics of the two optical signals of the corresponding channel.

BRIEF DESCRIPTION OF THE DRAWINGS

The above objects and advantages of the present invention will become more apparent by describing in detail preferred embodiments thereof with reference to the attached drawings in which:

FIG. 1 shows the spectrum of multiple optical channel signals in an arrayed waveguide grating (AWG);

FIG. 2 shows the spectrum of an i-th channel at the output ports of the AWG corresponding to a target channel to be monitored;

DESCRIPTION OF THE PREFERRED EMBODIMENTS

When a wavelength division multiplexing (WDM) signal to be monitored is input to an optical signal monitoring apparatus, an optical demultiplexer sends the multiple channel signals at a predefined wavelength to the output ports thereof. The output signals from the optical multiplexer must have a wavelength gap of 2 times denser than that of the WDM signal. For example, assuming that the WDM signal has a wavelength gap corresponding to 100 GHz, the wavelength gap corresponding to 50 GHz, which is half of the wavelength gap of the WDM signal, is required for the multiple output ports of the optical demultiplexer used in the optical signal monitoring apparatus.

If the number of wavelengths included in the WDM signal is N, a total of 2N+2 output ports are required for the optical demultiplexer. Each channel signal requires two output ports (2N) and two redundant ports (2) are also needed to measure the optical noise level outside of the frequency range between the two outermost wavelengths, and thus the total number of output ports of the optical demultiplexers reaches 2N+2. As shown in FIG. 1, which shows the wavelength transmission characteristics at the output ports of an arrayed waveguide grating (AWG), two channel signals for each channel are superposed at the center thereof. Here, the optical power of the i-th channel is measured from the channel signals output from the 2i-th and (2i+1)th output ports of the optical demultiplexer.

For convenience of explanation, prior to the description of the optical power and wavelength measurement, a configuration of an optical signal monitoring apparatus according to the present invention will now be described with reference to FIG. 3.

Figure 3:
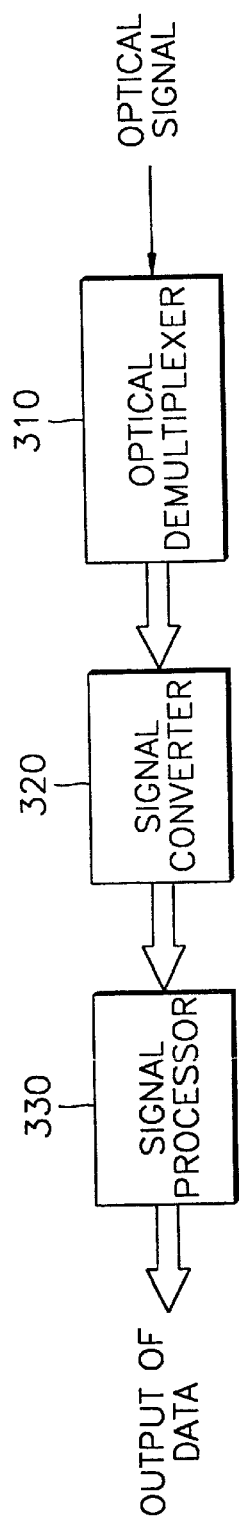
FIG. 3 is a block diagram of an exemplary embodiment of an optical signal monitoring apparatus according to the present invention.

FIG. 3 is a block diagram of an embodiment of the optical signal monitoring apparatus according to the present invention, which measures the optical power, the wavelength and the optical signal to noise ratio (OSNR) for each channel. The optical signal monitoring apparatus includes an optical demultiplexer 310, a signal converter 320 and a signal processor 330.

The optical demultiplexer 310 demultiplexes a WDM signal into multiple channel signals by wavelength. The signal converter 320 receives the channel signals, converts the optical channel signals into electrical signals by a predetermined operation for calculating the light intensity, and outputs the electrical signals to the signal processor 330. The signal processor 330 calculates the characteristics of each channel using the following equations, and outputs the same to an external system such as a WDM system or personal computer (PC).

The calculation of the optical power, the optical wavelength and the OSNR for each channel by using the optical signal monitoring apparatus having the configuration shown in FIG. 3 will now be described in greater detail.

FIG. 2 shows the spectrum of optical signals corresponding to a target channel to be monitored, which are output from the output ports of the AWG. For example, if the i-th channel is selected as a target channel, the transmission curves, i.e., the transmission loss curves $P_{loss1}$ and $P_{loss2}$ with respect to the wavelengths at two output ports of the AWG corresponding to the i-th channel, can be approximated by the following formulas (1) and (2) centering around the wavelength of the channel (according to the International Telecommunication Union (ITU) recommendation).

Here, $\lambda_i$ represents the central wavelength of the i-th channel, $\lambda_1$ represents the central wavelength of the 2i-th output port, and $\lambda_2$ represents the central wavelength of the (2i+1)th output port.

$$P_{loss1}=a_1(\lambda_i-\lambda_1)^2+b_1 \tag{1}$$

$$P_{loss2}=a_2(\lambda_i-\lambda_2)^2+b_2 \tag{2}$$

In the equations (1) and (2), $a_1$ and $a_2$ are the loss characteristic coefficient, and $b_1$ and $b_2$ are the loss offset coefficient.

Assuming that the optical power measured at the 2i-th output port is $P_{out1}$, the optical power at the (2i+1)th output port is $P_{out2}$, and the optical power of the i-th channel is $P_i$, the optical power $P_{out1}$ and $P_{out2}$ at the output ports of the AWG are expressed as the following equations (3) and (4):

$$P_{out1}=P_i+[a_1(\lambda_i-\lambda_1)^2+b_1] \tag{3}$$

$$P_{out2}=P_i+[a_2(\lambda_i-\lambda_2)^2+b_2] \tag{4}$$

If we subtract both sides of the equations (3) and (4) from each other, and then solve for $\lambda_i$, we obtain the following equation (5) when $a_1-a_2\neq 0$, and the following equation (6) when $$a_1-a_2=0$$

$$\lambda_i=\frac{-B\pm\sqrt{B^2-AC}}{A} \tag{5}$$

$$\lambda_i=\frac{C}{2B} \tag{6}$$

In the equation (5) and (6), $A=a_1-a_2$, $B=a_1\lambda_1-a_2\lambda_2$, and $C=(b_1-b_2)+(a_1\lambda_1^2-a_2\lambda_2^2)-(P_{out1}-P_{out2})$. For the equation (5), one of the two solutions, which is between $\lambda_1$ and $\lambda_2$, is obtained as the solution of the equation (5), i.e., as the wavelength $\lambda_i$ of the i-th channel.

Also, the optical power $P_i$ of the i-th channel is obtained by substituting the wavelength $\lambda_i$ of the i-th channel, which is obtained by solving the equation (5) or (6), into the equation (3) or (4). The equation (5) or (6) can be rearranged to express the optical power $P_i$ of the i-th channel as the following equation (7):

$$P_i=P_{out1}-[a_1(\lambda_i-\lambda_1)^2+b_1]$$

or $$P_i=P_{out2}-[a_2(\lambda_i-\lambda_2)^2+b_2] \tag{7}$$

As described above, the optical power of a target channel can be calculated by using the optical channel signals from the two neighboring output ports of the AWG, which are adjacent to the optical channel.

The loss characteristics can be approximated by linear equations, instead of the above-mentioned second order equations. A simple approximation of the loss characteristics by using linear equations is given by equations (8) and (9):

$$P_{loss1}=a_{11}\lambda_i+b_{11} \tag{8}$$

$$P_{loss2}=a_{22}\lambda_i+b_{22} \tag{9}$$

where $P_{loss1}$ and $P_{loss2}$ are the loss characteristics at the two output ports with respect to the wavelength $\lambda_i$ of the i-th channel, $a_{11}$ and $a_{22}$ are the linear loss characteristic coefficients, and $b_{11}$ and $b_{22}$ are the loss characteristic constants.

Assuming the optical power measured at the 2i-th output port is $P_{out1}$, the optical power at the (2i+1)th output port is $P_{out2}$, and the optical power of the i-th channel is $P_i$, the optical powers $P_{out1}$ and $P_{out2}$ at the output ports are expressed as the following equations (10) and (11):

$$P_{out1}=P_i+(a_{11}\lambda_i+b_{11}) \tag{10}$$

$$P_{out2}=P_i+(a_{22}\lambda_i+b_{22}) \tag{11}$$

In the equations (10) and (11), $\lambda_i$ represents the wavelength of the i-th channel, $a_{11}$ and $a_{22}$ are the linear loss characteristic coefficients, and $b_{11}$ and $b_{22}$ are the loss characteristic constants.

By rearranging the simultaneous equations (10) and (11) for the wavelength $\lambda_i$ of the i-th channel as the following equation (12), and substituting the measured optical power values at the output ports for $P_{out1}$ and $P_{out2}$, the wavelength $\lambda_i$ of the i-th channel is obtained.

$$\lambda_i = \frac{(P_{out1} - P_{out2}) + (b_{22} - b_{11})}{a_{11} - a_{22}} \quad (12)$$

Also, the optical power $P_i$ of the i-th channel is obtained by substituting the wavelength $\lambda_i$ of the i-th channel obtained by the equation (12) into the equations (10) or (11).

The approximation to loss characteristic curves can be achieved by using the Gaussian function, in addition to the linear or the second order function described above.

The calculation of the OSNR will now be described. For calculating the OSNR, first an optical noise level of an optical signal is required. The optical noise level can be measured from the outputs at the 1st and (2N+2)th output ports of the AWG (see FIG. 1). However, if the degree of crosstalk of the optical demultiplxer is high, error may occur during the optical noise measurement due to interference of the optical signals of neighboring channels. Thus, bandpass filters are inserted into the two output ports for accurate optical signal measurement. Here, the type of bandpass filter may be determined according to the type of optical demultiplexer.

The optical noise level measured from the outputs at the 1st and (2N+2)th output ports of the AWG is corrected using a predetermined program by the actual transmission band of the optical demultiplexer, to a value in the measuring range of an optical spectrum analyzer.

The optical noise level for each channel is calculated by interpolation using the optical noise level measured at the two outmost ports and the corrected value, and then the OSNR can be calculated with the optical power $P_i$ of the corresponding channel, which was calculated through the loss characteristic approximation described above.

Figure 4:
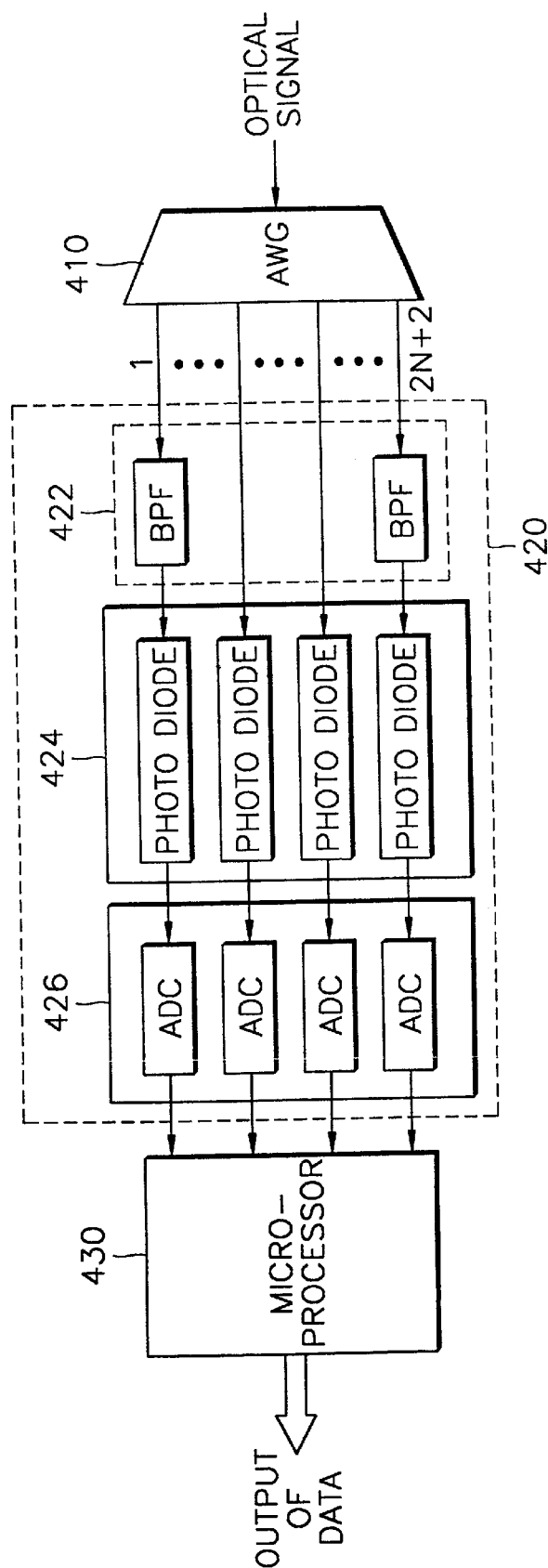
FIG. 4 is a block diagram of another exemplary embodiment of the optical signal monitoring apparatus according to the present invention.

FIG. 4 shows an exemplary embodiment of the optical signal monitoring apparatus of FIG. 3. The optical signal monitoring apparatus includes an AWG 410; a signal conversion unit 420 including a filtering portion 422, a photoelectric transducer 424 and an analog-to-digital signal converter (ADC) 426; and a microprocessor 430.

The AWG 410 is a means for receiving a WDM optical signal to output multiple channel signals having a phase difference corresponding to the length of the waveguide array therein. Here, the AWG 410 receives the WDM signal including N channels, and separates and outputs (2N+2) channel signals from the received WDM signal. Among these (2N+2) channel signals, the 1st and (2N+2)th signals of the outermost output ports, which are used to measure the optical noise level that is required for the OSNR measurement, are input to the filtering portion 422.

The filtering portion 422 passes only a predetermined wavelength band of the two channel signals, to eliminate the interference of the signals of the neighboring channels to the two optical channel signals for accurate optical noise measurement. The filtering portion 422 is constituted of a bandpass filter.

The photoelectric transducer 424 receives the channel signals of the two outermost output ports through the filtering portion 422, and the other demultiplexed channel signals of the 2nd through (2N)th output ports from the AWG 410, and converts the received optical signals into electrical signals in proportion to the intensity of the optical signals. Preferably, the photoelectric transducer 424 is constituted of a photo diode array or a charge coupled device (CCD).

The ADC 426 receives the electrical signals output from the photoelectric transducer 424, converts the received analog signals into digital signals, and outputs the digital signals to the microprocessor 430. The microprocessor 430 calculates the optical power, the wavelength and the OSNR for multiple channels using the above-mentioned equations. Also, the calculated information about the channel signals can be provided to an external device, for example, to a computer or WDM optical transmission system.

As described above, the information about multiple channel signals of a WDM optical signal, such as the optical power, the wavelength and the OSNR, can be simultaneously and accurately obtained by using the optical signal monitoring apparatus constructed as a small module.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical signal monitoring apparatus comprising:
    an optical demultiplexer having 2N output ports, for receiving and demultiplexing by wavelength a wavelength division multiplexing (WDM) signal with N wavelengths, and outputting two output port signals for each channel via the 2N output ports;
    a signal conversion unit for receiving the output port signals from the optical demultiplexer and converting the received optical output port signals into digital signals; and
    a signal processing unit for receiving the digital signals and calculating the wavelength and optical power for each channel using the loss characteristics of the two output port signals of each channel.

2. The optical signal monitoring apparatus of claim 1, wherein the optical demultiplexer comprises an arrayed waveguide grating (AWG).

3. The optical signal monitoring apparatus of claim 1, wherein the optical demultiplexer comprises two more output ports in addition to the 2N output ports, for outputting noise optical signals, one of which has a wavelength less than and the other of which has a wavelength greater than the wavelength range of the WDM signal, so that a total of 2N+2 signals are output.

4. The optical signal monitoring apparatus of claim 3, wherein the signal conversion unit comprises:
    a photoelectric transducer for converting the optical signals from the output ports of the optical demultiplexer into analog signals; and
    an analog-to-digital signal converter for converting the analog signals into digital signals.

5. The optical signal monitoring apparatus of claim 4, wherein the signal conversion unit further comprises a filtering portion for exclusively passing the noise optical signals.

6. The optical signal monitoring apparatus of claim 5, wherein the filtering portion comprises a bandpass filter.

7. The optical signal monitoring apparatus of claim 4, wherein the photoelectric transducer is a photo diode array.

8. The optical signal monitoring apparatus of claim 4, wherein the photoelectric transducer is a charge coupled device (CCD).

9. The optical signal monitoring apparatus of claim 3, wherein the signal processing unit comprises:
- means for calculating the wavelength for each channel using the loss characteristics at two output ports for the corresponding channel;
- means for calculating the optical power for each channel, using the loss characteristics and the optical power at two output ports for the corresponding channel, and the wavelength of the corresponding channel; and
- means for calculating an optical signal to noise ratio (OSNR) for each channel with the optical power of the corresponding channel and the optical power of the noise optical signals.

10. The optical signal monitoring apparatus of claim 1, wherein the signal processing unit comprises:
- means for calculating the wavelength for each channel using the loss characteristics at two output ports of the corresponding channel; and
- means for calculating the optical power for each channel, using the loss characteristics and the optical power at two output ports of the corresponding channel, and the wavelength of the corresponding channel.

11. A method of monitoring an optical signal, comprising the steps of:
- (a) demultiplexing by wavelength a wavelength division multiplexing (WDM) signal with N wavelengths into two optical signals for each channel, to output a total of 2N optical signals;
- (b) converting the optical signals from the step (a) into digital signals; and
- (c) receiving the digital signals to calculate the wavelength and the optical power for each channel, using the loss characteristics of the two optical signals of the corresponding channel.

12. The method of claim 11, wherein the step (a) comprises outputting two noise optical signals other than the 2N optical signals, one having a wavelength less than and the other having a wavelength greater than the wavelength range of the WDM signal, so that a total of 2N+2 optical signals are output.

13. The method of claim 12, wherein the step (c) comprises calculating the optical signal to noise ratio (OSNR) for each channel by comparing the optical power of the corresponding channel to the optical power of the noise signals.

14. The method of claim 11, wherein the step (c) comprises:
- calculating the wavelength for each channel using the loss characteristics of the two optical signals of the corresponding channel; and
- calculating the optical power for each channel, using the loss characteristics and the optical power of the two optical signals of the corresponding channel, and the wavelength of the corresponding channel.

15. The method of claim 11, wherein for monitoring the optical signals of each channel, the step (c) comprises:
- approximating the loss curves of the two output ports at the corresponding channel with respect to the wavelength thereof, using the equations (1) and (2)

$$P_{loss1} = a_1(\lambda_i - \lambda_1)^2 + b_1 \quad (1)$$

$$P_{loss2} = a_2(\lambda_i - \lambda_2)^2 + b_2 \quad (2)$$

where $P_{loss1}$ and $P_{loss2}$ are the loss curves of the two output ports at the corresponding channel, as a function of the wavelength $\lambda_i$ of the corresponding channel, $a_1$ and $a_2$ are the loss characteristic coefficients, $b_1$ and $b_2$ are the loss offset coefficients, $\lambda_i$ represents the wavelength of the corresponding channel, and $\lambda_1$ and $\lambda_2$ represent the wavelength of the two output ports at the corresponding channel;

calculating the optical power of the two output ports at the corresponding channel by the equations (3) and (4)

$$P_{out1} = P_i + [a_1(\lambda_i - \lambda_1)^2 + b_1] \quad (3)$$

$$P_{out2} = P_i + [a_2(\lambda_i - \lambda_2)^2 + b_2] \quad (4)$$

where $P_{out1}$ and $P_{out2}$ represent the optical power of the two output ports at the corresponding channel, and $P_i$ represents the optical power of the corresponding channel;

subtracting both sides of the equations (3) and (4) from each other, and solving them for $\lambda_i$ to obtain the wavelength $\lambda_i$ of the corresponding channel, wherein the wavelength $\lambda_i$ of the corresponding channel is between the wavelengths $\lambda_1$ and $\lambda_2$ of the two output port signals;

substituting the wavelength $\lambda_i$ of the corresponding channel into the equation (5), which is obtained by rearranging the equations (3) or (4) for the optical power $P_i$ of the corresponding channel, to calculate the optical power $P_i$ of the corresponding channel $$P_i = P_{out1} - [a_1(\lambda_i - \lambda_1)^2 + b_1]$$

or $$P_i = P_{out2} - [a_2(\lambda_i - \lambda_2)^2 + b_2] \quad (5).$$

16. The method of claim 11, wherein for monitoring the optical signals of each channel, the step (c) comprises:

approximating the loss curve of the two output ports at the corresponding channel with respect to the wavelength of the corresponding channel, using the equations (6) and (7)

$$P_{loss1} = a_{11}\lambda_i + b_{11} \quad (6)$$

$$P_{loss2} = a_{22}\lambda_i + b_{22} \quad (7)$$

where $P_{loss1}$ and $P_{loss2}$ are the loss curves of the two output ports at the corresponding channel, as a function of the wavelength $\lambda_i$ of the corresponding channel, and $a_{11}$ and $a_{22}$ are the linear loss characteristic coefficients, and $b_{11}$ and $b_{22}$ are the loss characteristic constants;

calculating the optical power of the two output ports at the corresponding channel by the equations (8) and (9)

$$P_{out1} = P_i + (a_{11}\lambda_i + b_{11}) \quad (8)$$

$$P_{out2} = P_i + (a_{22}\lambda_i + b_{22}) \quad (9)$$

where $P_{out1}$ and $P_{out2}$ represent the optical power of the two channel signals of the corresponding channel and $P_i$ represents the optical power of the corresponding channel;

calculating the wavelength $\lambda_i$ of the corresponding channel by the equation (10) which is obtained by rearranging the spontaneous equations (8) and (9) for $\lambda_i$ $$\lambda_i = \frac{(P_{out1} - P_{out2}) + (b_{22} - b_{11})}{a_{11} - a_{22}} \quad (10)$$

and calculating the optical power $P_i$ of the corresponding channel by substituting the wavelength $\lambda_i$ of the corresponding channel obtained by the equation (10) into the equation (8) or (9).

* * * * *